(12) United States Patent
Geibl et al.

(10) Patent No.: US 6,461,758 B1
(45) Date of Patent: Oct. 8, 2002

(54) BATTERY WITH VENT CAP ASSEMBLY

(75) Inventors: Matthias Geibl, Germantown; Thomas J. Dougherty, Waukesha; Gerald D. Slayton, South Milwaukee; Mark S. Inkmann, Wauwatosa; Guy L. Pfeifer, Milwaukee, all of WI (US); Gerald A. Cummins, Union, KY (US); Edward C. Frelka, Muskego, WI (US); Edward N. Mrotek, Grafton, WI (US); Helmuth Faust, Brookfield, WI (US); Arch A. Pope, Holland, OH (US); David J. Novak, Menomonee Falls, WI (US); William J. Ross, Mukwonago, WI (US); Bradley R. Niemuth, Germantown, WI (US); Ronald F. Kirby, Racine, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/622,737

(22) PCT Filed: Feb. 24, 1999

(86) PCT No.: PCT/US99/03987

§ 371 (c)(1),
(2), (4) Date: Oct. 20, 2000

(87) PCT Pub. No.: WO99/43033

PCT Pub. Date: Aug. 26, 1999

Related U.S. Application Data

(63) Continuation-in-part of application No. 09/028,732, filed on Feb. 24, 1998, now Pat. No. 6,143,438.

(51) Int. Cl.[7] ................................................. H01M 2/12

(52) U.S. Cl. ............................................. 429/72; 429/82
(58) Field of Search ............................. 429/72, 82, 87, 429/88, 89, 78

(56) References Cited

U.S. PATENT DOCUMENTS

| | | | | |
|---|---|---|---|---|
| 3,394,035 | A | * 7/1968 | Cox et al. ..................... | 429/78 |
| 4,029,855 | A | 6/1977 | Dougherty et al. ........... | 429/82 |
| 4,338,383 | A | 7/1982 | Jutte et al. .................... | 429/88 |
| 4,778,735 | A | 10/1988 | Shestok et al. ............... | 429/82 |
| 5,132,175 | A | 7/1992 | Mrotek et al. ................ | 429/86 |
| 5,162,164 | A | 11/1992 | Dougherty et al. ........... | 429/9 |
| 5,217,823 | A | 6/1993 | Geibl et al. ................... | 429/55 |
| 5,284,720 | A | 2/1994 | Thuerk et al. ................ | 429/87 |

FOREIGN PATENT DOCUMENTS

| | | |
|---|---|---|
| DE | 1905215 | 8/1970 |
| DE | 1906191 | 8/1970 |
| FR | 2153702 | 4/1973 |
| GB | 1599755 | 10/1981 |

OTHER PUBLICATIONS

PCT International Search Report dated Jul. 29, 1999 in PCT Appln. No. PCT/US99/03987.

* cited by examiner

Primary Examiner—Gabrielle Brouillette
Assistant Examiner—Monique Wills
(74) Attorney, Agent, or Firm—Foley & Lardner

(57) ABSTRACT

An improved vent cap system for use in an electrochemical battery is provided which includes a ring flange for forming a ring seal between the vent cap assembly and the fill tube. When the vent cap assembly is positioned in the battery housing, the ring flange and the fill tube deform to create a seal therebetween to provide a fluid tight seal.

50 Claims, 5 Drawing Sheets

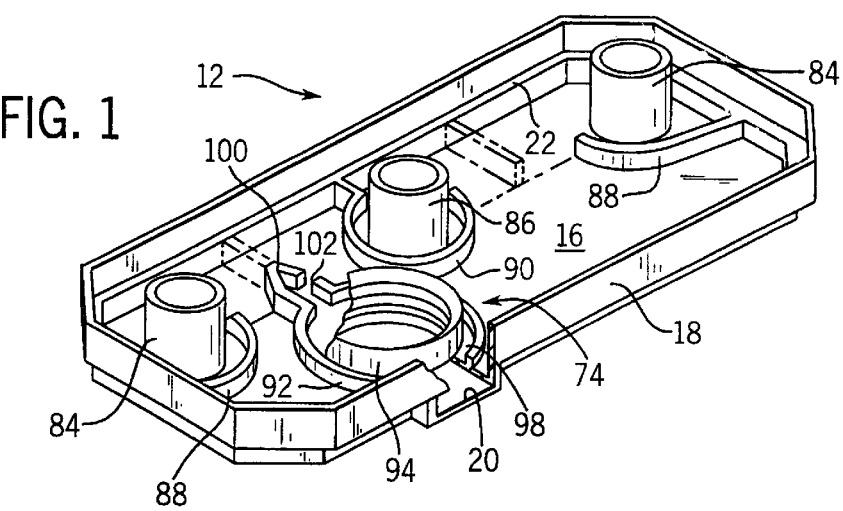
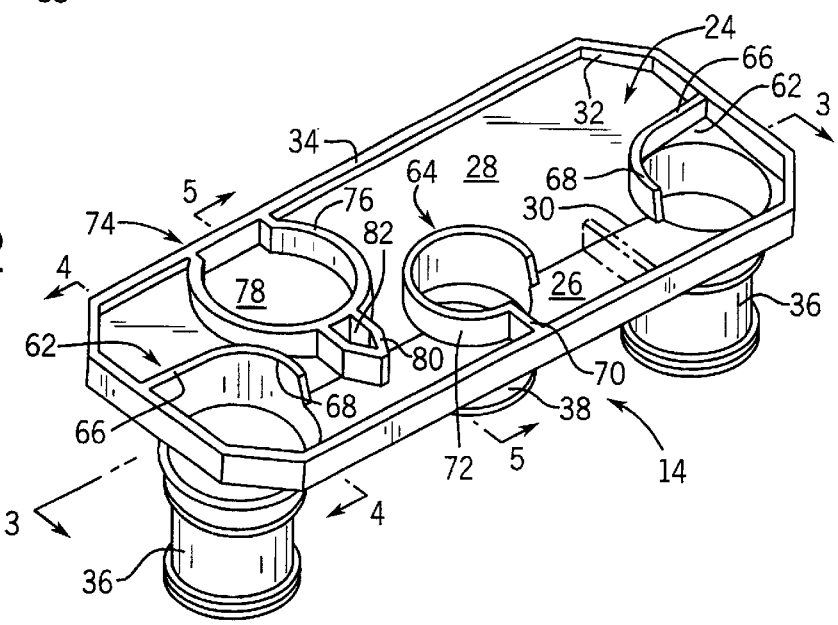
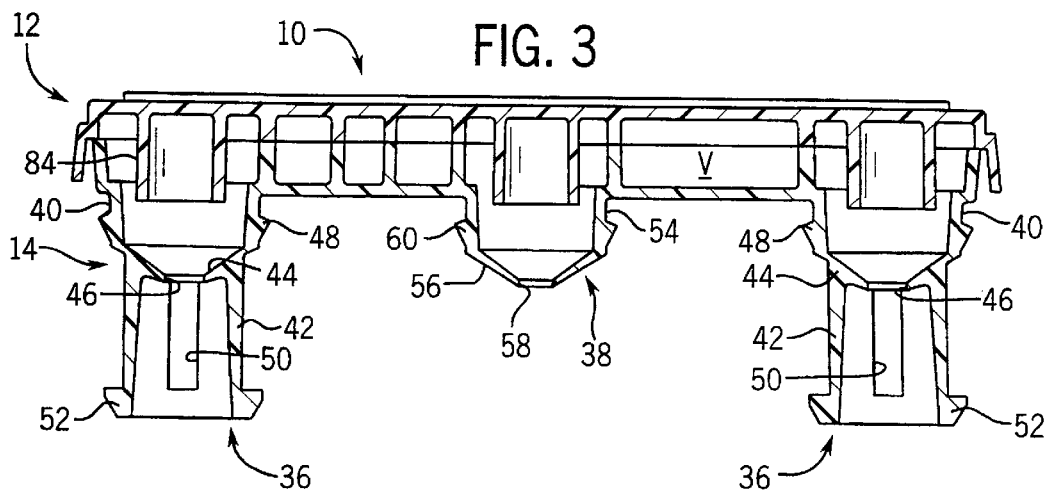

BATTERY WITH VENT CAP ASSEMBLY

This application is continuation-in-part of application Ser. No. 09/028,732 filed Feb. 24, 1998 now U.S. Pat. No. 6,143,438.

BACKGROUND OF THE INVENTION

1. Field of the Invention

The present invention relates generally to sealed electric storage batteries, and more particularly to vent caps for such batteries which provide a flow path for the escape of hydrogen and oxygen formed during the electrochemical reaction which takes place in such batteries. Still more specifically, the invention relates to a vent cap which also controls the flow of electrolyte which may enter the vent cap to ensure that it is returned to the battery cell and does not flow through the vent cap to the exhaust gas port or become entrained in the flow of gases passing through the vent cap. The invention also relates to a vent cap assembly for partial insertion in the battery fill tubes to facilitate cleaning the battery cover surface area under the vent cap assembly without permitting cleaning fluid to enter the battery housing, and for full insertion in the battery fill tubes after cleaning.

2. Description of Related Art

Conventional lead-acid batteries, such as those used in automotive applications, generally include a number of cells disposed in a battery housing. Each cell typically includes a plurality of positive and negative battery plates or electrodes. Separators are sandwiched between the plates to prevent shorting and undesirable electron flow produced during the reaction occurring in the battery. The plates and separators are immersed in a liquid electrolyte in the cell, the most common being aqueous sulfuric acid. The positive plate generally is constructed of a lead-alloy grid covered with lead oxide, while the negative plate generally contains lead as the active material, again covering a lead-alloy grid.

The electromotive potential of each battery cell is determined by the chemical composition of the electro-active substrates employed in the electrochemical reactions. For lead-acid batteries, such as those described above, the potential is usually about two volts per cell, regardless of cell volume. Since vehicles manufactured by original equipment manufacturers (OEMs) typically require 12-volt batteries, most automotive batteries include six cells (6 cells×2 volts per cell=12 volts). The size of the housing for the battery is selected based on the packaging constraints of a particular vehicle, i.e., the physical dimensions defined by the vehicle manufacturer for containment of the battery in the engine compartment.

In most battery constructions the battery housing includes a box-like base containing the cell and is made of a moldable resin. The housing is generally rectangular in horizontal cross section, the cells being provided by vertical partitions within the housing. A cover is provided for the casing, the cover includes terminal bushings and a series of fill tubes to allow electrolyte to be added to the cells and to permit servicing, if required, during the life of the battery. To prevent undesirable spillage of electrolyte from the fill tubes, and to permit exhausting of gases generated during the electrochemical reaction, batteries have included some sort of filler hole cap and/or vent cap assemblies. Battery electrolyte spillage can be caused by a number of factors, including vibration or tilting as the vehicle with which the battery is used maneuvers during normal use. Electrolyte escape may also be caused by battery overheating, a problem especially pronounced in recent years with smaller car engines which tend to create an adverse thermal environment around the battery.

In addition to preventing spillage of electrolyte from the cells, the design of the battery cover and filler caps need to perform an important and different function, namely exhaust of gases generated during the electrochemical reaction. More specifically, gases are liberated from lead-acid batteries during the charge and discharge reactions. Such reactions start at the time the battery is originally charged (called "formation") by the manufacturer or by the retailer or vehicle manufacturer. They also occur during normal operating use of the battery. Factors such as high current charge and discharge conditions, and changes in temperature, can affect the rate at which gas evolution occurs. The gas generation and evolution issues in lead-acid battery construction are particularly important because the liberated gases are hydrogen and oxygen, and it is important to vent such gases in a controlled way from the battery to prevent pressure build-ups in the housing which could lead to electrolyte leaks, housing failures or, most significantly, explosions within the housing.

Electrolyte spillage and gas evolution are interrelated and equally important in the construction of an effective vent cap system. For example, electrolyte may enter the vent cap through several mechanisms. One mechanism is through vibrational or tilting spray of electrolyte into the cap, and another is through a mechanism frequently referred to as "pumping." The latter occurs when gas evolved in the battery bubbles from the cells and carries or forces electrolyte out the fill tube and into the cap. Upon entering the cap, the electrolyte may be carried out the exhaust passage to cause damage to external battery components such as the battery terminals or adjacent engine components.

OEMs have recognized the importance of the dual function performed by the vent caps and have instituted a number of testing specifications designed to ensure electrolyte retention within the cells of the battery. One such test involves tilting a battery thirty-five degrees (35°) about the longitudinal center line of the battery. While a number of different solutions have been proposed to provide an effective vent cap system, optimization has still not been achieved in one vent cap due to numerous demands with which the battery designer is faced—ensuring adequate electrolyte return, condensation, reducing electrolyte in the exhaust flow, pumping of electrolyte through the vent cap system and tilting of the battery. All of these factors can result in electrolyte loss.

An improved vent cap system for minimizing the possibility of electrolyte leakage from the battery and efficiently directing gases from the battery is still needed. Such an improved vent cap would represent a substantial advance in the art.

The current process for installing the battery vent cap assemblies also presents a problem. In order to understand the problem, it is first necessary to review part of the process for manufacturing a battery. Initially, the battery housing, including its cover, is provided containing the battery cells. The battery housing is submerged in acidic electrolyte fluid in order to fill the battery housing with electrolyte fluid through the fill tube holes in the battery cover. After filling the battery housing with electrolyte fluid, the battery is removed from the electrolyte fluid; however, some residual electrolyte fluid usually remains on external surfaces of the battery housing, and oftentimes, dust and other debris associated with the manufacturing environment adhere to the residual electrolyte fluid coating on the battery housing external surfaces. The residual electrolyte fluid coating, dust, and other debris must be washed away to prepare the battery for shipment. Before washing the battery housing external surfaces, the fill tube holes must be plugged to prevent washing fluid from entering the battery housing.

In the present practice (as depicted in FIG. 10), the fill tube holes are temporarily capped with what those skilled in the art refer to as "work-in-process vents" or "in-process vents." FIG. 12 shows a common in-process vent 300 inserted in a fill tube hole of battery cover 316. In-process vent 300 prevents electrolyte spillage and permits evolution of subsequently generated gases within the battery housing. In-process vent 300 includes an upper portion 312 and a protruding member 314 extending from a bottom surface of upper portion 312. Gases generated within the battery housing pass through protruding member 314 to upper portion 312 where the gases are vented from the battery housing. FIG. 12 shows only one protruding member 314 for in-process vent 300; however, in-process vent 300 includes a protruding member 314 for insertion into each fill tube hole in battery cover 316. With the in-process vents 300 installed, the external surfaces of the battery housing are washed in order to remove electrolyte fluid and other debris from the battery housing surfaces. The bottom surface of upper portion 312 is far enough above the surface of battery cover 316 to permit washing the battery cover surface located beneath in-process vent 300.

Following the initial wash stage, the battery cells are charged in a process known as formation. Heat generated during formation oftentimes causes evaporation of some of the electrolyte fluid which is exhausted through the in-process vents 300. If needed, the in-process vents 300 are removed and additional electrolyte fluid is added through the fill tube holes in order to top off the battery electrolyte fluid level. Then, the in-process vents 300 are reinstalled and the battery cells are charged again in order to attain a fully charged battery. The in-process vents 300 are removed once more in order to facilitate topping off electrolyte fluid level, if necessary. At this point, the battery cells are fully charged, and the electrolyte level is optimum, but before the production vent cap assemblies are installed to complete production of the battery, the external surfaces of the battery housing and cover 316 are cleaned again in order to remove any residual electrolyte fluid and any other debris. The present approach for this process is depicted in FIG. 10. In the prior art process, the protruding members 314 for the in-process vents 300 are inserted into the fill tube holes in the battery cover 316. Then, the battery is typically removed to a washing-type machine. Following washing and rinsing of the external surfaces of the battery housing and cover 316, the battery is moved to a drying-type machine. Following drying, the in-process vents 300 are removed and final, production vent cap assemblies are inserted to complete production of the battery. The problem with the prior art approach is that it requires the use of additional labor, cost, and time to install the in-process vents 300, wash the battery, dry the battery, remove the in-process vents 300, and then install the final vent cap assemblies.

An improved vent cap assembly obviating the prior practice of having to use in-process vents 300 to prevent cleaning fluid from entering the battery housing during the final washing of the housing is needed. Such an improved vent cap assembly would represent a significant advance in the art.

DISCLOSURE OF THE INVENTION

The present invention provides a vent cap system which includes a one-piece or two-piece construction adapted to facilitate electrolyte return to the battery, minimize electrolyte entrainment of the exhaust flow path, distribution of electrolyte to a plurality of battery cells to maintain desirable electrolyte level and an improved barrel construction. More particularly, the vent cap sealing mechanism of the present invention minimizes the escape of gas or electrolytes around the barrel and into the space between the bottom of the vent cap and the battery cover.

The present invention also features a vent cap in which any electrolyte flow into the cap is redirected back to a cell of the battery, while gases escaping from the battery are directed to a gas outlet through a tortuous but effective gas flow path. These particular features are also accomplished in various battery orientations, including orientations in which the battery is tilted significantly about its longitudinal axis.

The present invention also features a vent cap having internal baffles constructed and arranged to prevent accumulation of pockets of electrolyte within the cap and an attenuation element entry port arranged and constructed to minimize intrusion of electrolyte.

These and other features will become apparent from the following detailed description of the preferred embodiment, taken in conjunction with the figures. Generally, however, they are accomplished by providing a vent cap system having a ganged arrangement for three battery fill tubes and including molded thermal plastic component. The vent cap includes three aligned splash barrels to be inserted in the battery fill tubes, each including a lower central aperture, breather holes about the central aperture and an external ring flange surrounding the barrel to act as a fluid tight seal between the barrels and the fill tubes.

In one preferred embodiment, the vent cap includes a top and bottom component. Barrels extend from an angled floor of the cap of the bottom component adjacent an edge thereof so that any electrolyte entering the cap will flow toward the aligned and spaced apart barrel openings. Barriers are provided about the barrel openings to prevent pockets of electrolyte from accumulating in the cap. The lower component also includes the bottom portion of a flame arrester housing which itself includes an entry chamber. The top component includes downwardly directed tubes or splash guards having open bottoms and being arranged to be coaxial with but spaced slightly above the barrel openings when the top and bottom components are assembled. The top component also includes the upper portion of the flame arrester housing including a cup for receiving the preferred micro-porous material, and the entry chamber. The latter is open to provide a pathway for the escape of gases through the arrester and out of an exhaust port provided in the upper compartment. The opening to the arrester housing is optimally located in the upper half of the vent cap and above the center line of the barrel openings.

Another embodiment of the present invention provides a vent cap assembly for a battery of the type having electrolyte therein. The vent cap assembly comprises a top portion, and a vent cylinder extending downwardly from the top portion and arranged to be inserted into a fill tube of a battery housing. The vent cylinder includes a first portion forming a first interference fit between the first portion and the fill tube when the vent cylinder is partially inserted in the fill tube sufficient to prevent fluid from entering the fill tube, and further including a second portion forming a second interference fit between the second portion and the fill tube when the vent cylinder is fully inserted in the fill tube. The magnitude of interference for the second interference fit is greater than the magnitude of interference for the first interference fit. When the vent cylinder is partially inserted in the fill tube, spacing exists between a top surface of the battery housing and a bottom surface of the top portion to permit washing and drying the top surface of the battery housing located beneath the top portion of the vent cap assembly.

The second portion comprises a ring flange formed on an outer wall of the vent cylinder having a radial thickness formed on the vent cylinder such that the second interference fit exists between the ring flange and the fill tube, and the vent cylinder is insertable within the fill tube such that the ring flange deforms to create a ring seal between the vent cylinder and the fill tube. The ring flange and the fill tube may deform to create a ring seal between the vent cylinder and the fill tube. The second interference fit is in the range between seven thousandths and forty thousandths of an inch (0.007"–0.040"). The ring flange comprises a trailing portion formed on a first end of the ring flange adjacent to the top portion, and a leading portion formed on an end of the ring flange opposite the first end thereof. The leading portion and the trailing portion intersect to form an apex that is slightly rounded to provide a smooth transition between the leading portion and the trailing portion. The leading portion includes a first sloped face having an angular orientation in the range between twenty degrees and forty degrees (20°–40°) relative to the outer wall of the vent cylinder, and the trailing portion includes a second sloped face having an angular orientation in the range between ninety-five degrees and one hundred and fifteen degrees (95°–115°) relative to the outer wall of the vent cylinder. The first portion comprises a member coupled to and extending down from the ring flange, and the member has a tubular shape.

Another embodiment of the present invention provides a method for removing electrolyte fluid and debris adhering to external surfaces of a battery comprising the steps of filling the battery with the electrolyte fluid, fully charging the battery, partially inserting vent cylinders of a vent cap assembly into fill tubes of the battery to form a first interference fit between each vent cylinder and each fill tube sufficient to permit washing the external surfaces without allowing washing fluid to enter the fill tubes, and fully inserting the vent cylinders of the vent cap assembly into the fill tubes to form a second interference fit between each vent cylinder and each fill tube. The method further includes the steps of washing the external surfaces, including a surface located beneath the vent cap assembly, while the vent cap assembly is partially inserted; and drying the external surfaces.

The improved vent cap assembly and its method of use obviate the prior practice of having to use of an in-process vent during battery washing before a final, production vent cap assembly could be inserted into the battery housing. Specifically, the improved vent cap assembly is partially inserted into the battery housing during battery washing, and then completely inserted to ready the battery use.

Other ways in which the vent cap (and the vent cap assembly and its method of use) of the present invention, or modifications thereof, provide the features mentioned above, and other improvements over the prior art, will become apparent to one of ordinary skill in the art after reading the balance of the specification and after reviewing the drawings. Such other ways and modifications are deemed to be within the scope of the present invention.

BEST MODES OF CARRYING OUT THE INVENTION

The objects and features of this invention will become apparent from a reading of the following detailed description taken in conjunction with the drawings in which:

FIG. 1 is a perspective view of the interior of the top component of the vent cap system of the present invention;

FIG. 2 is a perspective view of the interior of the lower component of the vent cap system of the present invention;

FIG. 3 is a cross-sectional view of the assembled vent cap system illustrated in FIGS. 1 and 2 taken along the line 3—3 shown in FIG. 2;

In the various figures, like reference numerals are used to indicate like components.

BEST MODES FOR CARRYING OUT THE INVENTION

Figure 4:
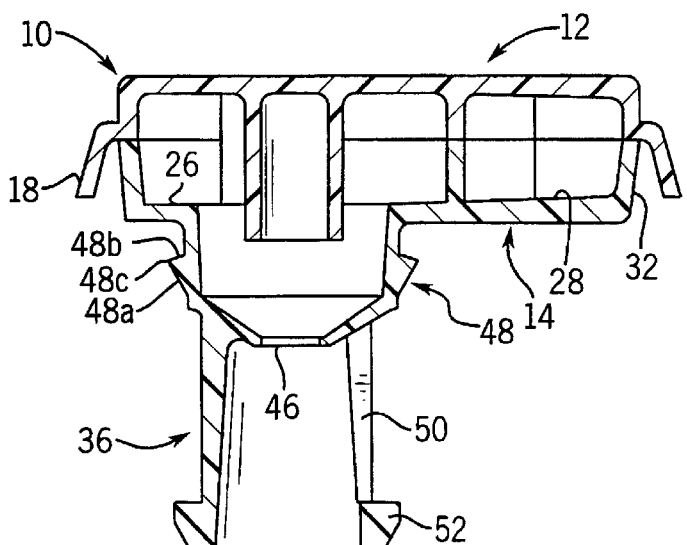
FIG. 4 is a cross-sectional view of the assembled vent cap system taken along the line 4—4 shown in FIG. 2.
Figure 5:
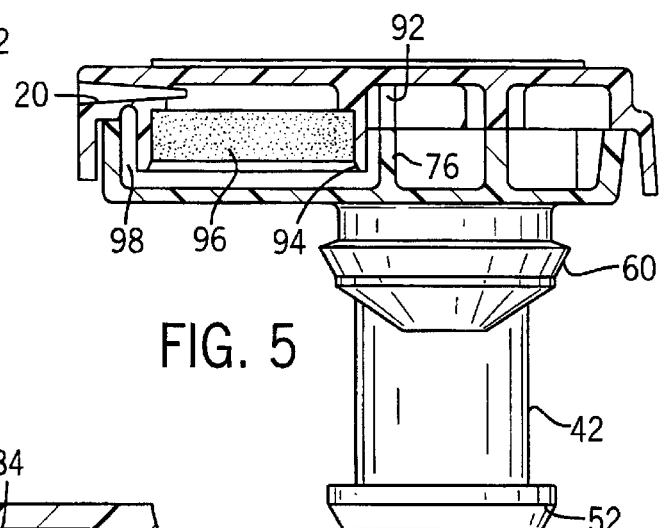
FIG. 5 is a cross-sectional view of the assembled vent cap system taken along line 5—5 shown in FIG. 2.

Before proceeding to a detailed description of the preferred embodiments, several general comments are warranted concerning the scope and applicability of the present invention. The improved vent cap assembly of the present invention includes several novel features which, when combined, lead to the most preferred embodiment. However, several of these features could be employed individually or in subcombinations to achieve specific needs for a particular battery design.

A ganged three (3) fill tube arrangement is illustrated and described herein which is an arrangement that is fairly typical of vent caps used in a number of current battery designs, such as those used for 12-volt automobile batteries. Ganged caps having more or less barrels per cap are encompassed by the present invention and could be readily constructed and designed by one of ordinary skill in the art after reading this specification.

The preferred material for constructing the vent caps of the present invention is a polypropylene copolymer with about 18 weight percent polyethylene, but other thermal plastic moldable resins which provide a similar cold flow characteristic as the preferred material can be used. In fact, thermoset resins could be also employed if a technique other than heat sealing is employed to join the multiple component cap assemblies together. One such technique would be the use of adhesives. An essential property of the material used for the cap components is that it exhibits a good cold flow characteristic which enabled a ring seal to be formed in the fill tube when the vent cap assembly is installed within the battery fill tube. Another primary criteria for the cap components, as well as for any explosion attenuation material used therein, is that these components be able to withstand the harsh environment encountered in lead-acid battery systems, including reduced and elevated temperatures and the acidic environment generated by the battery electrolyte. Similarly, a soft ABS and nylon based plastic, such as Noral manufactured and distributed by General Electric, could be utilized for the components of the vent cap system of the present invention.

Many of the dimensional relationships are for illustrative purposes and could vary widely with different types of batteries. Unless otherwise noted, these dimensions are deemed to be noncritical. For example, the length of the barrels, as well as the width, length and height of the cap, can be varied without departing from the invention's intended scope.

Referring now to FIGS. 1–6, vent cap assembly 10 includes a top component 12 and a bottom component 14 which are interfit in a spaced facing relationship. More specifically, top portion 12 includes a planar upper surface 16 and a stepped skirt 18 extending therefrom. Vent passageway 20 is formed through skirt 18 along a side of top component 12 and provides fluid communication from the interior of vent cap assembly 10 to the outside environment therearound. A stepped flange 22 is formed in top assembly 12 and engages a complementary edge formed on bottom component 14 as hereinafter described.

Referring now to FIG. 2, bottom component 14 includes floor 24 comprised of two sections, a horizontal section 26 and an inclined section 28 extending from planar horizontal section 26 at transition line 30. Bottom component 14 also includes skirt 32 having interface edge 34 formed thereon. When assembled, interface edge 34 of bottom portion 14 directly abuts flange 22 of upper portion 12 in a nesting configuration. These two major components of vent cap assembly 10 are joined to one another by any suitable means, such as by heat sealing edge 34 of bottom portion 14 to flange 22 of top portion 12. In this manner, vent cap assembly 10 defines an interior vent cap volume v.

Bottom component 14 incudes three vent cylinders, a pair of outer vent cylinders 36 and an inner vent cylinder 38, extending downwardly from floor 24. Vent cylinders 36, 38 are arranged in a linear, spaced apart relationship, the center of which lay along transition line 30. Outer vent cylinder 36 includes a generally cylindrical upper portion 40 and a generally cylindrical lower portion 42. An inwardly tapered surface 44 is formed between upper portion 40 and lower portion 42 and includes a central aperture 46 extending therethrough to provide fluid communication between upper portion 40 and lower portion 42. Ring flange 48 is formed on an outer surface of upper portion 40 and provides a ring sealing mechanism when vent cap assembly 10 is properly positioned within a battery housing as will be further described herein. Lower portion 42 has longitudinal slot 50 formed therein to provide fluid communication to the interior volume of lower portion 42. Retaining flange 52 is formed on the outer surface of lower portion 42 at an end opposite of upper portion 40. Aperture 46 and breather slot 50 will permit electrolyte and gases to enter or leave the cap when it is assembled and the vent cylinders are placed in the fill tubes of the battery.

Lower portion 42 and retaining flange 52 of outer vent cylinder 36 is provided to ensure proper alignment of vent cap assembly 10 during insertion within fill tube 104 of battery housing 106. More specifically, retaining flange 52 is dimensioned to engage a bottom edge 108 defined by fill tube 104 such that vent cap assembly 10 is precisely installed and locked into position. More specifically, retaining flange 52 slightly deforms fill tube 104 in an elastic manner until positioned below bottom edge 108. At this point, fill tube 104 returns to its original dimension so that bottom edge 108 engages retaining flange 52 to secure vent cap assembly 10 to battery housing 106. While the inclusion of cylindrical lower portion 42 and retaining flange 52 is presently preferred, one skilled in the art would readily recognize that other means exist for appropriately aligning and retaining vent cap assembly 10 within battery housing 106.

Inner vent cylinder 38 includes a cylindrical wall portion 54 extending from floor 24 and terminating at tapered surface 56. Aperture 58 is formed in tapered surface 56. Ring flange 60 is formed on an outer surface of cylindrical wall portion 54 and provides a ring seal between inner vent cylinder 38 and the fill tube of the battery housing in a manner further described herein.

With particular reference to FIG. 4, floor 24 includes planar portion 26 and inclined portion 28. Planar portion 26 extends along skirt 32 adjacent vent cylinders 36, 38 and extends inwardly to transition line 30 through the axis of vent cylinders 36, 38. Floor 24 then rises along inclined portion 28 to skirt 32 opposite vent cylinders 36, 38. The incline in the most preferred embodiment is four and one half degrees (4.5°), but could be in a broader preferred range of three degrees to six degrees (3°–6°), or even broader range of about one degree to sixteen degrees (1°–16°). Thus, inclined portion 28 facilitates drainage of electrolyte which has accumulated within vent cap assembly 10 by directing the electrolyte toward vent cylinders 36, 38 where it is returned to the battery cell.

With reference to FIG. 2, bottom component 14 includes baffles 62, 64, circumscribing outer vent cylinder 36 and inner vent cylinder 38, respectively. Outer baffles 62 include a linear portion 66 extending generally perpendicular from skirt 32 and a generally arcuate portion 68 which partially extends around outer vent cylinder 36. Similarly, inner baffle 64 includes a linear portion 70 extending generally perpendicularly from skirt 32 and an arcuate portion 72 extending partially around inner vent cylinder 38. Outer baffles 62 and inner baffles 64 direct the flow of electrolyte from inclined surface 28 toward vent cylinders 36, 38 to further facilitate drainage into the cell of the battery.

Bottom component 14 also includes flame arrester housing 74 having a generally circular wall portion 76 extending from skirt 32 and defining a first chamber 78. A five-sided wall portion 80 extends from a portion of circular wall 76 opposite skirt 32 and defines a second chamber 82.

With reference now to FIGS. 1, 3 and 4, top component 12 includes outer tubular splash guards 84 and inner tubular splash guards 86 extending generally perpendicularly from top planar portion 16. Splash guards 84, 86 are open and of a length selected so that the open end is spaced slightly below the plane defined by planar portion 26 of floor portion 24 when vent cap assembly 10 is fully assembled. Top component 12 further includes outer baffle 88 and inner baffle 90 shaped and generally arranged to meet with and to be sealed to outer baffle 62 and inner baffle 64, respectively. Splash barrels 84, 86 and baffles 88, 90 will form walls extending between top portion 16 of top component 12 and floor 24 of bottom component 14, acting to effectively prevent splashing of electrolyte entering vent cap assembly 10 from apertures 46, 58 beyond the containment provided thereby. This structure, however, permits unobstructed flow paths from vent cylinders 36, 38 to the interior volume of vent cap assembly 10.

Top component 12 also has a portion of flame arrester housing 74 formed therein including an outer circular wall 92 having an upper surface adapted to engage and be sealed to circular wall 76 formed on bottom component 14. An inner circular wall 94 is formed concentric to and is generally taller than outer circular wall 92. Inner circular wall 94 is adapted to receive flame arrester disk 96 (shown in FIG. 5) which, in the most preferred embodiment, is made from a micro-porous cintered polyethylene material. Annular passageway 98 is thus provided between outer and inner circular walls 92, 94 which is in fluid communication with vent port 20. A five-sided wall portion 100 extends from outer cylindrical wall 92 opposite skirt 18 and is adapted to engage and be sealed with five-sided wall portion 80 of bottom component 14. A passageway is provided in five-sided wall portion 100 to permit fluid communication from the interior volume of vent cap assembly 10 to annular passageway 98. As presently preferred, passageway 102 is located directly above a line passing through the center of outer and inner splash barrels 84, 86 and located at the highest possible location within vent cap assembly 10, thereby minimizing the intrusion of liquid electrolyte into flame arrester housing 74.

Figure 6:
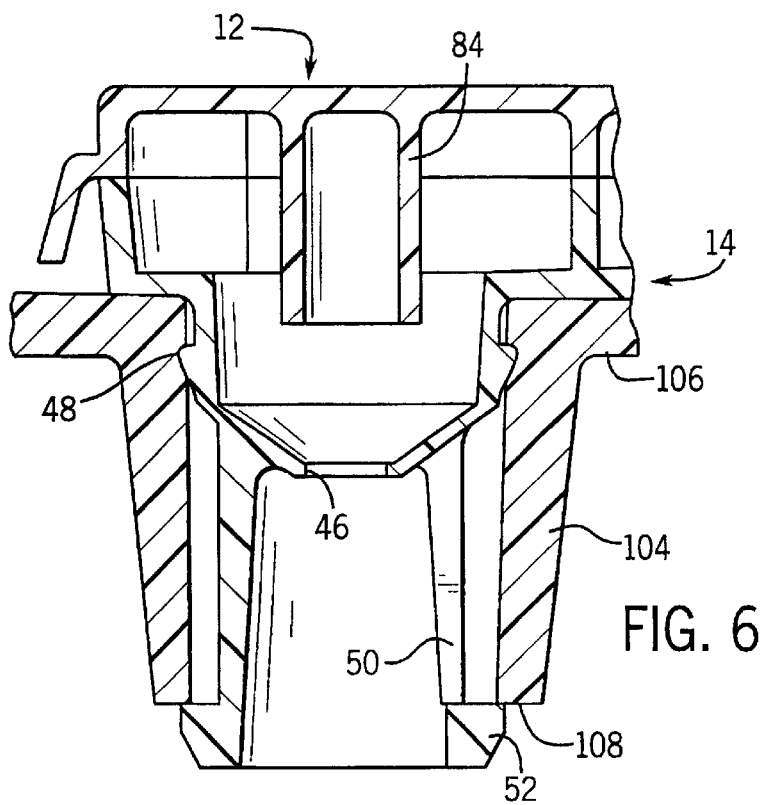
FIG. 6 is a cross-sectional view similar to that shown in FIG. 3 in which the vent cap system is sealably installed within a battery housing.

An important feature of the present invention is the use of ring flange 48, 60 to create a ring seal between vent cylinder 36, 38 and fill tube 104 when vent cap assembly 10 is positioned on battery housing 106. With particular reference to FIGS. 4 and 6, ring flange 48 has leading portion 48*a* formed on a lower edge thereof and trailing portion 48*b* formed on an upper portion thereof. The intersection of leading portion 48*a* and trailing portion 48*b* defines apex 48*c* which is slightly rounded to provide a smooth transition therebetween. Leading portion 48*a* defines a first sloped face having an angular orientation relative to the outer wall of vent cylinder 36 of between twenty and forty degrees (20°–40°) and preferably thirty degrees (30°). Trailing portion 48*b* defines a second sloped face having an angular orientation relative to the outer wall of vent cylinder 36 of between ninety-five and one hundred fifteen degrees (95°–115°) and preferably one hundred five degrees (105°).

Ring flange 48 is formed of a polypropylene copolymer plastic with approximately 5–20% polypropylene by weight, and has a radial thickness, i.e. the distance from the outer wall of upper cylindrical portion 40 of vent cylinder 36 to apex 48*c*, such that an interference exists between apex 48*c* and fill tube 104 of battery housing 106. It is important to provide a sufficient interference to create an adequate ring seal without utilizing excessive force to insert vent cap 10 into fill tube 104. An interference in the range between seven thousandths and forty thousandths of an inch (0.007"–0.040"), and more preferably on the order of twenty thousandths to twenty-seven thousandths of an inch (0.020"–0.27"), provides sufficient overlap to create an adequate ring seal between ring flange 48 and fill tube 104. Fill tube 104 is formed of a polypropylene copolymer plastic with approximately 5–20% polyethylene by weight, and has a wall thickness in the range between of approximately thirty thousandths and eighty thousandths of an inch (0.030"–0.080") and more preferably on the order of fifty thousandths to sixty thousandths of an inch (0.050"–0.060") to allow for sufficient wall deformation to create an adequate ring seal.

FIG. 6 illustrates an especially preferred example of the present invention in which the overall length of ring flange 48 is 0.5", the radial thickness of ring flange 48 is 0.05", the angle of leading portion 48*a* is formed at 30°, and the angle of trailing portion 48*b* is formed at 105°. Fill tube 106 is formed of polyethylene and has a wall thickness of sixty thousandths of an inch (0.060"). Ring flange 48 is formed of a polypropylene copolymer and has an interference of approximately twenty-four thousandths of an inch (0.024") with fill tube 106.

When vent cap assembly 10 is positioned on battery housing 106, ring flanges 48, 60 and fill tube 104 deform to create a ring seal therebetween. As such a uniform compression is imposed on ring flange 48, 60 by fill tube 104. More specifically, an adequate seal is formed when ring flange 48, 60 and fill tube 104 deform such that ring flange 48, 60 appears to be whetted on fill tube 104. A ring seal in the range of twenty-five thousandths and one-hundred thousandths of an inch (0.025"–0.100") is adequate and a ring seal on the order of fifty thousandths to sixty thousandths of an inch (0.050"–0.060") is preferred to provide a fluid tight seal between vent cylinder 36, 38 and fill tube 104 of battery housing 106.

Figure 7:
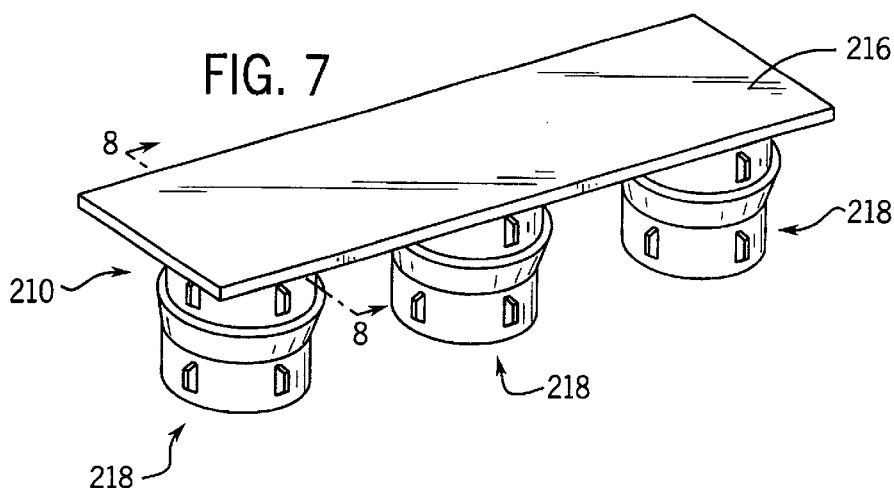
FIG. 7 is a perspective view of a second preferred embodiment of the present invention.
Figure 8:
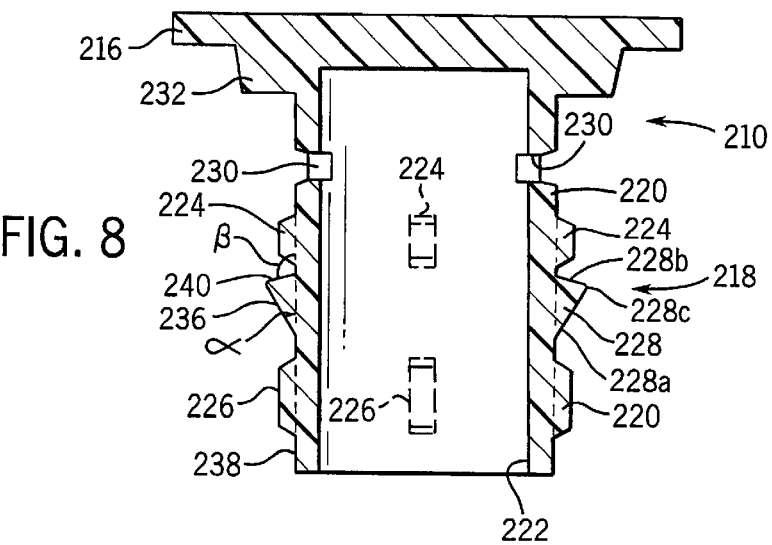
FIG. 8 is a cross-sectional view of the vent cap system illustrated in FIG. 7 taken along the line 8—8 shown therein.
Figure 9:
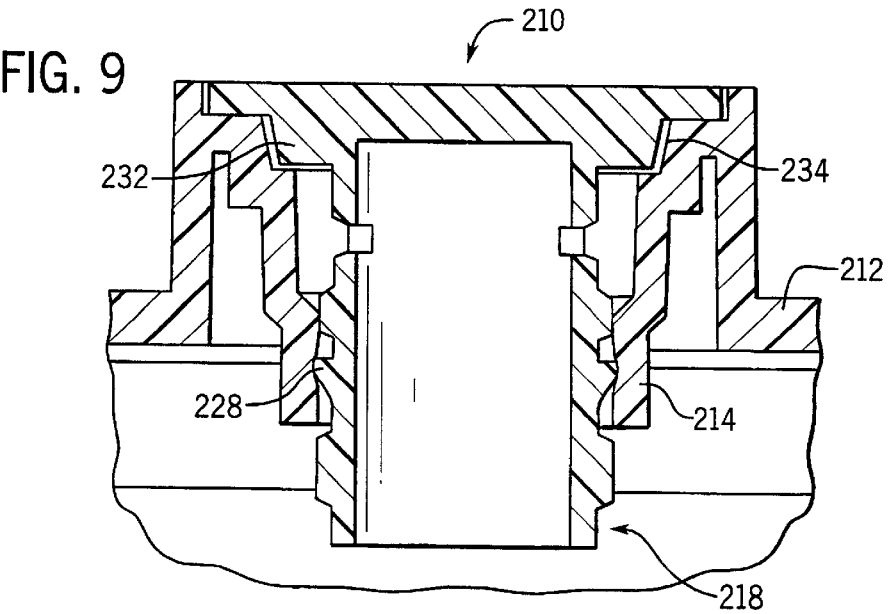
FIG. 9 is a cross-sectional view similar to that shown in FIG. 8 showing the second preferred vent cap system installed within a battery housing.
Figure 10:
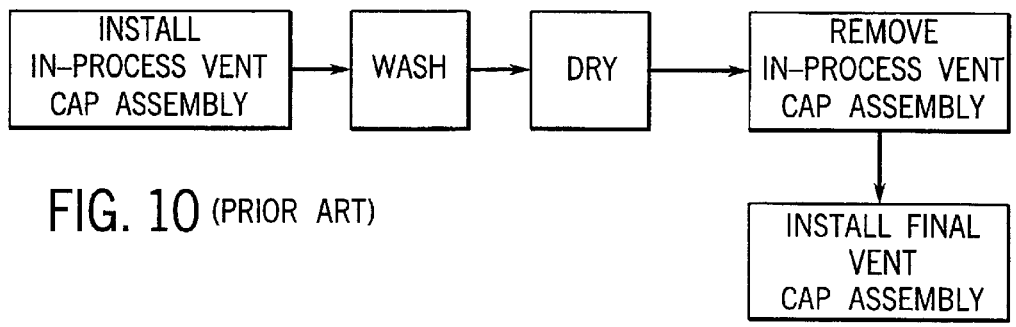
FIG. 10 is a simplified block diagram depicting the prior practice of using in-process vents during the final washing stage of battery production.

With reference now to FIGS. 7–9, vent cap assembly 210 is a one-piece assembly which is inserted into battery cover 212 having fill tubes 214 extending therefrom. Vent cap assembly 210 includes a substantially rectangular top portion 216 having three vent cylinders 218 extending downwardly therefrom. Vent cylinders 218 include a generally cylindrical portion 220 having a central aperture 222 formed therethrough. Upper and lower retaining flanges 224, 226 are formed on the outer wall of cylindrical portion 220. Similarly, ring flange 228 is formed on an outer surface of cylindrical portion 220 between upper and lower retaining flanges 224, 226. Breather slots 230 are formed in cylindrical wall 220 to provide fluid communication therethrough.

As presently preferred, top portion 216 has a shoulder portion 232 formed thereon for appropriately positioning vent cap assembly 210 within battery housing 212. More specifically, battery housing 212 has a stepped recess 234 formed therein which is complimentary to shoulder portion 232. When vent cap assembly 210 is appropriately positioned in battery housing 212, stepped recess 234 receives shoulder portion 232.

As with the first preferred embodiment of the present invention, vent cap assembly 210 includes ring flange 228 to create a ring seal between vent cylinder 220 and fill tube 214 when vent cap assembly 210 is positioned on battery housing 212. With particular reference to FIGS. 8 and 9, ring flange 228 has a leading portion 228*a* formed on a lower edge thereof and a trailing portion 228*b* formed on an upper portion thereof. The intersection of leading portion 228*a* and trailing portion 228*b* defines apex 228*c* which is slightly rounded to provide a smooth transition therebetween. Leading portion 228*a* defines a first sloped face 236 having an angular orientation, α, of between twenty and forty degrees (20°–40°) relative to the outer wall 238 of vent cylinder 36.

Preferably, first sloped face 236 has an angular orientation of thirty degrees (30°). Trailing portion 228b defines a second sloped face 240 having an angular orientation, β, of between ninety-five degrees and one hundred and fifteen degrees (95°–115°) relative to the outer wall 238 of vent cylinder 36. Preferably, second sloped face 240 has an angular orientation of one hundred and five degrees (105°). As previously described, the dimensional aspects of ring flange 228 and the interference between ring flange 228 and fill tube 214 are such that a ring seal is formed in the range of twenty-five thousandths to one hundred thousandths of an inch (0.025"–0.100"), and more preferably on the order of fifty thousandths to sixty thousandths of an inch (0.050"–0.060"), thereby providing a fluid tight seal between vent cap assembly 210 and fill tube 214 of battery housing 212.

Figure 11:
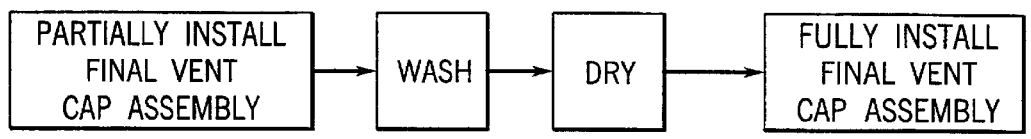
FIG. 11 is a simplified block diagram depicting the improved process of the present invention for conducting the final wash of the battery housing without requiring use of in-process vents.
Figure 12:
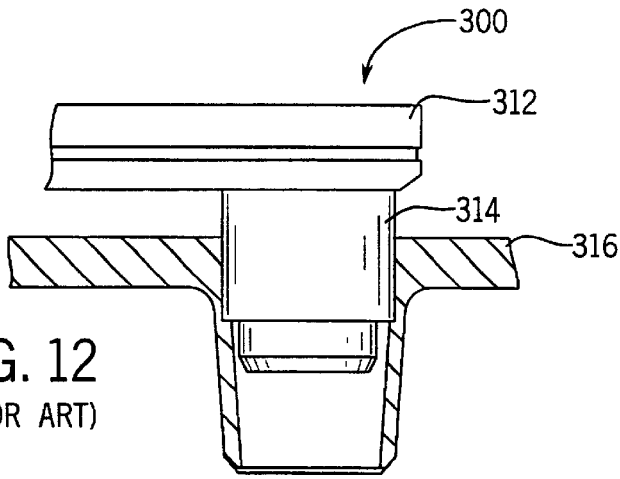
FIG. 12 is a side elevational view showing a portion of an in-process vent installed in a fill tube in the battery housing.
Figure 13A:
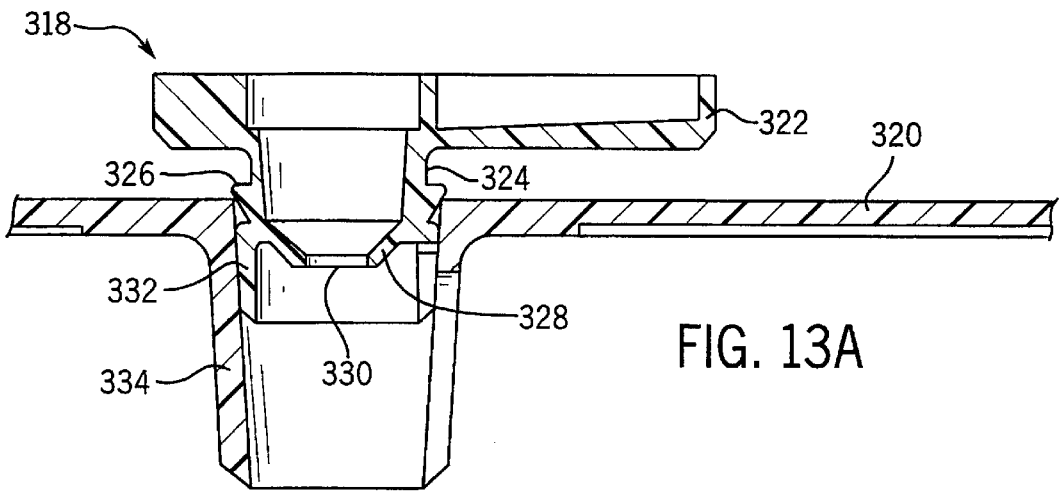
FIG. 13A is a cross-sectional view of the improved vent cap assembly of the present invention showing a vent cylinder partially inserted into a fill tube in the battery housing.

Referring to FIG. 11, a simplified block diagram symbolizes use of the new and improved vent cap assemblies in an improved process for cleaning batteries. Moving from left to right through the block diagram of FIG. 11, the initial process step involves partially installing the final vent cap assembly or production vent cap assembly, as opposed to an in-process vent cap assembly 300. FIG. 13A shows the improved vent cap assembly 318 of the present invention partially inserted into a fill tube 334 of battery housing 320. Vent cap assembly 318 includes a ring flange 326 coupled to an extension 332. With vent cap assembly 318 partially inserted into fill tube 334, extension 332 establishes an interference fit between extension 332 and fill tube 334, while ring flange 326 rests atop battery housing 320. The interference fit between extension 332 and fill tube 334 is sufficient to permit washing (see FIG. 11) the exterior surfaces of the battery housing 320 without allowing water to enter fill tube 334. Additionally, a bottom surface of bottom component 322 of vent cap assembly 318 is located sufficiently far away from extension 332 to permit cleaning of the portion of battery housing 320 located beneath bottom component 322. After the external surfaces of battery housing 320 are washed in order to remove residual electrolyte fluid and other debris, fluid remaining on the surfaces from the washing process is dried (see FIG. 11). Again, the bottom surface of bottom component 322 is located far enough away from extension 332 to permit the portion of battery housing 320 located beneath bottom component 322 to be dried.

Figure 13B:
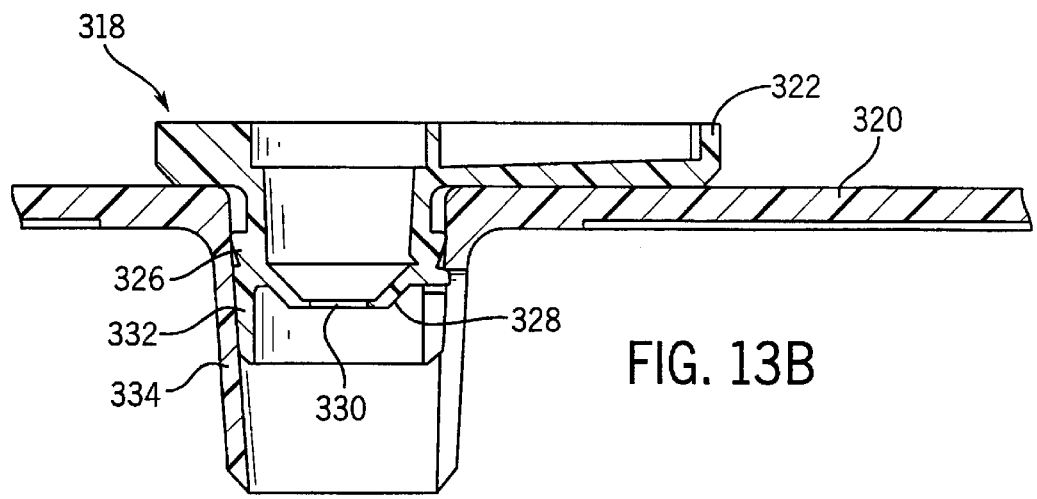
FIG. 13B is a cross-sectional view of the improved vent cap assembly of the present invention showing the vent cylinder fully inserted into the fill tube in the battery housing.

Once the external surfaces of battery housing 320 are completely dried, vent cap assembly 318 is fully installed into fill tube 334, as shown in FIG. 13B. With vent cap assembly 318 fully installed in fill tube 334, the bottom surface of bottom component 322 abuts the cover of battery housing 320 and ring flange 326 no longer rests atop the cover of battery housing 320. Rather, ring flange 326 is located below the upper surface of the battery cover and within fill tube 334 when vent cap assembly 318 is fully inserted in fill tube 334. In this position, ring flange 326 establishes an interference fit with fill tube 334 sufficient to prevent fluid (other than gas exhausted through vent cap assembly 318) from entering or leaving battery housing 320.

Figure 14:
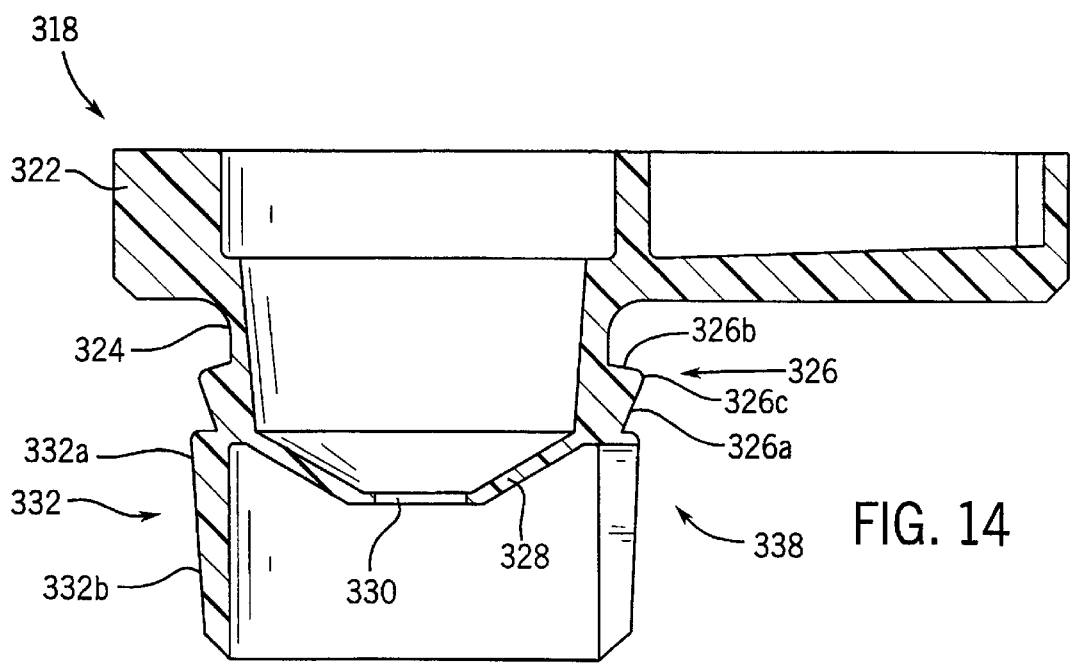
FIG. 14 is a cross-sectional view of the improved vent cap assembly of the present invention.

Referring to FIG. 14, vent cap assembly 318 includes a bottom component 322 coupled to a top component (not shown). The top component is not shown for simplification of the drawing; however, a top component is generally coupled to bottom component 322 of vent cap assembly 318 in a manner like or approximately like that shown for vent cap assemblies shown in FIGS. 1–9. For example, the top and bottom 322 components of vent cap assembly 318 may comprise a uniform piece or multiple pieces bonded together. Also, like the vent cap assemblies shown in FIGS. 1–9, vent cap assembly 318 includes internal structure (not shown for simplification of the drawing) within the cavity formed between the top component and bottom component 322 for permitting evolution of gases generated within battery housing 320 and for retaining electrolyte fluid within battery housing 320.

Still with reference to FIG. 14, a vent cylinder 338 is coupled to and extends away from the bottom surface of bottom component 322. Specifically, the upper portion of vent cylinder 338 includes a generally cylindrical portion 324 connected to the bottom surface of bottom component 322. The opposite end of cylindrical portion 324 is connected to ring flange 326 of vent cylinder 338. The opposite end of ring flange 326 is connected to extension 332. A conical member 328 resides within the internal cavity of vent cylinder 338. The base of conical member 328 is coupled in proximity to the junction between ring flange 326 and extension 332. The apex of conical member 328 lies below the junction between ring flange 326 and extension 332. Additionally, the apex of conical member 328 is removed to form a central aperture 330 providing fluid communication between the structure located in the cavity formed by top and bottom components 322 and the interior region of the battery housing 320.

Still referring to FIG. 14, ring flange 326 creates a ring seal between vent cylinder 338 and fill tube 334 when vent cap assembly 318 is fully inserted into battery housing 320 (see FIG. 13B). Ring flange 326 has leading portion 326a formed on the lower edge thereof, and trailing portion 326b formed on an upper portion thereof. The intersection of leading portion 326a and trailing portion 326b defines apex 326c which is slightly rounded to provide a smooth transition there between. Leading portion 326a defines a first sloped face having an angular orientation relative to the outer wall of vent cylinder 338 of between 20 and 40 degrees (20°–40°) and preferably 30 degrees (30°). Trailing portion 326b defines a second sloped face having an angular orientation relative to the outer wall of vent cylinder 338 of between 95 and 115 degrees (95°–115°) and preferably 105 degrees (105°).

Ring flange 326 is formed of a polypropylene copolymer plastic with approximately 5 to 20 percent polypropylene by weight, and has a radial thickness, i.e., the distance from the outer wall of cylindrical portion 324 of vent cylinder 338 to apex 326c such that an interference exists between apex 326c and fill tube 334 of battery housing 320. It is important to provide sufficient interference to create an adequate ring seal without utilizing excessive force to insert vent cap assembly 318 into fill tube 334. An interference in the range between 7 thousandths and 40 thousandths of an inch (0.007"–0.040") provides sufficient overlap to create an adequate ring seal between ring flange 326 and fill tube 334. Fill tube 334 is formed of a polypropylene copolymer plastic with approximately 5 to 20 percent polyethylene by weight, and has a wall thickness in the range between approximately 30 thousandths and 80 thousandths of an inch (0.030"–0.080"), and more preferably on the order of 50 thousandths to 60 thousandths of an inch (0.050"–0.060") to allow for sufficient wall deformation to create an adequate ring seal.

Still with reference to FIG. 14, extension 332 comprises a generally tubular member having an upper section 332a connected to ring flange 326 and a lower section 332b connected to an opposite end of upper section 332a. The exterior surface of upper section 332a is generally co-planar with a plane tangentially situated against cylindrical portion 324. Upper section 332a consists approximately of the upper one-half portion of extension 332, while lower section 332*b* consists essentially of the lower one-half of extension 332. The external surface of lower section 332*b* is inwardly tapered relative to the plane formed by the external surface of upper section 332*a*. Lower section 332*b* is inwardly tapered within an approximate range of between 0 and 5 degrees (0°–5°), and preferably 3 degrees (3°). The inward taper of lower section 332*b* facilitates easy insertion of vent cylinder 338 into fill tube 334. Since lower section 332*b* is inwardly tapered, upper section 332*a* establishes the widest outer diameter for extension 332. When vent cap assembly 318 is partially inserted in fill tube 334 (as shown in FIG. 13A), upper section 332*a* of extension 332 establishes an interference fit with fill tube 334. An interference in the range between 7 thousandths and 40 thousandths of an inch (0.007"–0.040") provides sufficient overlap to create an adequate ring seal between upper section 332*a* of extension 332 and fill tube 334. In the preferred embodiment, the interference between upper section 332*a* of extension 332 and fill tube 334 caused by partially inserting vent cap assembly 318 into fill tube 334 is approximately 8 thousandths of an inch (0.008"). An inner diameter for fill tube 334 of 750 thousands of an inch (0.750") and an outer diameter of upper section 332*a* of approximately 758 thousandths (0.758") establishes an interference of 8 thousands of an inch (0.008") within the desired range of interference. The interference established between upper section 332*a* and fill tube 334 when vent cap assembly 318 is partially inserted in fill tube 334 is sufficient to permit cleaning the exterior surfaces of battery housing 320 without permitting cleaning fluids from entering battery housing 320 through fill tube 334.

The interference established between ring flange 326 and fill tube 334 is generally greater than that established between upper section 332*a* and fill tube 334. For example, an inner diameter for fill tube 334 of 750 thousandths of an inch (0.750") and an outer diameter of ring flange 326 of 787 thousandths of an inch (0.787") results in a ring flange interference with fill tube 334 of 37 thousandths of an inch (0.037"). The lower magnitude interference fit established by upper section 332*a* with fill tube 334 is sufficient to permit cleaning exterior surfaces of battery housing 320 without permitting cleaning fluid from entering fill tube 334, and the higher magnitude interference fit established between ring flanges 326 and fill tube 334 insures a tighter seal of vent cap assembly 318 with fill tube 334 for the finished battery.

Figure 15:
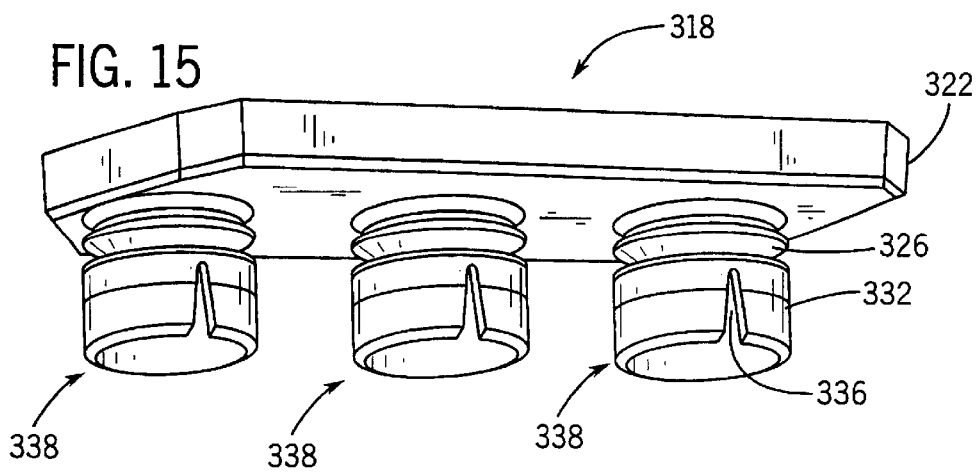
FIG. 15 is a perspective view of the improved vent cap assembly of the present invention showing a plurality of vent cylinders.

Referring to FIG. 15, a perspective view of vent cap assembly 318 shows a plurality of vent cylinders 338 extending from the bottom surface of bottom component 322. Each vent cap assembly 338 includes a ring flange 326 and an extension 332 like those shown in FIG. 14. Though not visible in FIGS. 13A, 13B, and 14, each extension 332 includes a vertical breather slot 336 working with an aperture 330 (see FIG. 14) to permit electrolyte and gas to enter and leave the internal cavity formed between the top component and bottom component 322 of vent cap assembly 318.

It should be apparent that the present invention provides an improved vent cap assembly 318 for use in an electrochemical battery. While the present invention has been described with reference to a particular embodiment, one skilled in the art would readily recognize that certain modifications could be made thereto without deviating from the scope of the present invention as set forth in the following claims. For example, each vent cylinder 338 has been described as having a ring flange 326 and an extension 332 for providing an interference fit when vent cap assembly 318 is partially inserted, and for providing a tighter interference fit when vent cap assembly 318 is fully inserted; however, those skilled in the art understand that there are alternative means for providing a pair of interference fits on vent cylinder 338. For example, rather than providing vent cylinder 338 having a ring flange 326 connected to an extension 332 to provide one interference fit with fill tube 334 when vent cylinder 338 is partially inserted and another interference fit with fill tube 334 when vent cylinder 338 is fully inserted, vent cylinder 338 may comprise a tubular member having a tapered exterior surface that provides an interference fit with fill tube 334 when vent cylinder 338 is partially inserted in fill tube 334 and a greater interference fit with fill tube 334 when vent cylinder 338 is fully inserted.

What is claimed is:

1. A method for producing a battery having external surfaces comprising:

filling the battery with a fluid;

charging the battery;

inserting at least one vent cylinder of a vent cap assembly into at least one fill tube of the battery in a first position to permit washing the external surfaces without allowing washing fluid to enter the fill tube; and inserting the vent cylinder into the fill tube in a second position to retain the vent cylinder.

2. The method of claim 1 further including:

washing the external surfaces of the battery, including a surface located beneath the vent cap assembly, while the vent cap assembly is inserted in the first position.

3. A vent cap assembly for a battery comprising:

an upper portion, a vent cylinder configured for insertion into a fill tube of the battery and including a first portion configured to prevent fluid from entering the fill tube when the vent cylinder is inserted in the fill tube in a first position and a second portion configured to retain the vent cylinder in a second position.

4. The vent cap assembly of claim 3 wherein:

the upper portion comprises a top component and a bottom component fitted in abutting relationship.

5. The vent cap assembly of claim 3 wherein:

when the vent cylinder is partially inserted in the fill tube, spacing exists between a top surface of a battery housing and a bottom surface of the upper portion to permit washing and drying the top surface of the battery housing located beneath the upper portion of the vent cap assembly.

6. The vent cap assembly of claim 3 wherein:

the second portion comprises a ring flange formed on an outer wall of the vent cylinder and is configured for forming an interference fit between the ring flange and the fill tube.

7. The vent cap assembly of claim 6 wherein:

the ring flange and the fill tube deform to create a seal between the vent cylinder and the fill tube.

8. The vent cap assembly of claim 6 wherein:

the interference fit is between about seven thousandths and forty thousandths of an inch.

9. The vent cap assembly of claim 6 wherein the ring flange comprises:

a trailing portion formed on a first end of the ring flange adjacent to the upper portion; and a leading portion formed on an end of the ring flange opposite the first end thereof, the leading portion and the trailing portion intersecting to form an apex.

10. The vent cap assembly of claim 9 wherein:
the apex of the ring flange is slightly rounded to provide a smooth transition between the leading portion and the trailing portion.

11. The vent cap assembly of claim 9 wherein:
the leading portion includes a first sloped face having an angular orientation in the range between twenty degrees and forty degrees relative to the outer wall of the vent cylinder, and the trailing portion includes a second sloped face having an angular orientation in the range between about ninety-five degrees and one hundred and fifteen degrees relative to the outer wall of the vent cylinder.

12. The vent cap assembly of claim 6 wherein:
the first portion comprises a member coupled to and extending down from the ring flange.

13. The vent cap assembly of claim 12 wherein:
the member has a tubular shape.

14. The method of claim 2 further comprising drying the external surfaces.

15. The method of claim 1 wherein the vent cylinder is partially inserted into the fill tube in the first position.

16. The method of claim 1 wherein the vent cylinder is fully inserted into the fill tube in the second position.

17. The method of claim 1 further comprising a seal coupled to the vent cylinder and configured to retain the vent cylinder in the second position.

18. The method of claim 17 wherein the seal comprises a flange.

19. The method of claim 17 wherein the seal comprises a ring.

20. The vent cap assembly of claim 3 wherein the second portion is configured to deform an inner wall of the fill tube to create a seal between the second portion and the fill tube when the vent cylinder is inserted in the second position.

21. The vent cap assembly of claim 20 wherein the first portion is configured to deform an inner wall of the fill tube to create a seal between the first portion and the fill tube when the vent cylinder is inserted in the first position.

22. The vent cap assembly of claim 21 wherein the deformation of the fill tube resulting from the insertion of the vent cap in the first position is less than the deformation resulting from the insertion of the vent cap in the second position.

23. A method for manufacturing a storage battery comprising:
partially inserting at least one vent cylinder of a production vent cap assembly into a battery fill tube;
washing the external surfaces of the battery with the vent cylinder partially inserted into the fill tube; and
fully inserting the vent cylinder into the fill tube.

24. The method of claim 23 wherein partially inserting the vent cylinder into the fill tube causes an extension attached to the vent cylinder to abut the fill tube.

25. The method of claim 24 wherein partially inserting the vent cylinder into the fill tube causes at least one of the extension and the fill tube to deform.

26. The method of claim 24 wherein fully inserting the vent cylinder into the fill tube causes a ring flange attached to the vent cylinder to abut the fill tube.

27. The method of claim 26 wherein fully inserting the vent cylinder into the fill tube causes at least one of the ring flange and the fill tube to deform.

28. The method of claim 26 wherein the extension has a first outer diameter and the ring flange has a second outer diameter, the second outer diameter being greater than the first outer diameter.

29. The method of claim 28 wherein both the first outer diameter and second outer diameter are greater than an interior diameter of the fill tube.

30. The method of claim 23 further comprising introducing an electrolyte fluid into a battery housing with the vent cylinder partially inserted into the fill tube.

31. The method of claim 23 wherein the production vent cap assembly is configured for relatively permanent installation in a storage battery.

32. A storage battery comprising:
at least one fill tube;
a vent cap assembly including at least one vent cylinder having a first diameter and configured for insertion into the fill tube between a first position and a second position; and
a seal coupled to the vent cylinder and having a second diameter greater than the first diameter;
wherein the vent cylinder in the first position is configured for inhibiting fluid from entering the fill tube, and the vent cylinder in the second position is configured for retaining the at least on vent cylinder.

33. The storage battery of claim 32 wherein the first position is a cleaning position.

34. The storage battery of claim 32 wherein the second position is a use position.

35. The storage battery of claim 32 wherein the vent cap assembly comprises a vent cap.

36. The storage battery of claim 32 wherein the seal is a ring.

37. The storage battery of claim 32 wherein the seal is a flange.

38. The storage battery of claim 32 wherein the vent cylinder is configured for abutting the fill tube when the vent cylinder is in the first position.

39. The storage battery of claim 38 wherein at least one of the vent cylinder and the fill tube deform when the vent cylinder is in the first position.

40. The storage battery of claim 38 wherein the abutting of the vent cylinder and the fill tube forms a ring seal.

41. The storage battery of claim 38 wherein the abutting of the vent cylinder and the fill tube at least partially inhibits fluid from entering a battery housing around the fill tube.

42. The storage battery of claim 32 wherein the vent cylinder and fill tube form a first interference fit in the first position and a second interference fit in the second position, the second interference fit having a magnitude greater than the magnitude of the first interference fit.

43. A vent cap assembly for a storage battery having a vent cylinder configured for installation in a battery fill tube, the improvement comprising:
a first tapered portion configured for engaging the battery fill tube when the vent cylinder is inserted into the fill tube in a first position;
a second tapered portion configured for engaging the battery fill tube when the vent cylinder is inserted into the fill tube in a second position; wherein the vent cylinder in the first position is configured for inhibiting fluid from entering the fill tube, and the vent cylinder in the second position is configured for retaining the at least on vent cylinder.

44. The vent cap assembly of claim 43 wherein at least one of the first tapered portion and the second tapered portion is formed of a plastic material.

45. The vent cap assembly of claim 43 wherein second tapered portion is a ring flange.

46. The vent cap assembly of claim 43 wherein second tapered portion is configured for deforming the fill tube when the vent cylinder is inserted in the second position.

47. The vent cap assembly of claim 43 wherein the first tapered portion is configured for preventing fluid from entering a battery housing between the vent cylinder and the fill tube when the vent cylinder is inserted in the first position.

48. The vent cap assembly of claim 43 wherein the second portion includes a leading portion and a trailing portion, the trailing portion having an angular orientation relative to the outer wall of the vent cylinder of between approximately 95 and 115 degrees.

49. The storage battery of claim 32 wherein the vent cylinder in the first position is configured for washing the storage battery such that fluid is inhibited from entering the fill tube, and the vent cylinder in the second position is configured for retaining the at least one vent cylinder.

50. The vent cap assembly of claim 43 wherein the vent cylinder in the first position is configured for washing the storage battery such that fluid is inhibited from entering the fill tube, and the vent cylinder in the second position is configured for retaining the at least one vent cylinder.

\* \* \* \* \*

UNITED STATES PATENT AND TRADEMARK OFFICE
CERTIFICATE OF CORRECTION

PATENT NO. : 6,461,758 B1
DATED : October 8, 2002
INVENTOR(S) : Mark S. Inkmann et al.

It is certified that error appears in the above-identified patent and that said Letters Patent is hereby corrected as shown below:

Title page,
Item [75], Inventors, delete the following inventors "Matthias Geibl, Germantown; Thomas J. Dougherty, Waukesha; Gerald D. Slayton, South Milwaukee; Guy L. Pfeifer, Milwaukee, all of WI (US);"; and insert -- , WI (US) -- after "Inkmann, Wauwatosa".

Column 16,
Lines 23 and 64, delete "on" and insert therefore -- one --.

Signed and Sealed this

Twenty-fifth Day of March, 2003

JAMES E. ROGAN
*Director of the United States Patent and Trademark Office*